May 14, 1957     E. A. HAGGLUND     2,792,254
BUG AND GRAVEL SHIELD FOR VEHICLES

Filed April 6, 1956                      2 Sheets-Sheet 1

INVENTOR.
EUGENE A. HAGGLUND,
BY
McMorrow, Berman & Davidson
ATTORNEYS.

May 14, 1957 — E. A. HAGGLUND — 2,792,254
BUG AND GRAVEL SHIELD FOR VEHICLES
Filed April 6, 1956 — 2 Sheets-Sheet 2

INVENTOR.
EUGENE A. HAGGLUND,
BY
McMorrow, Berman + Davidson
ATTORNEYS.

United States Patent Office 2,792,254
Patented May 14, 1957

2,792,254
BUG AND GRAVEL SHIELD FOR VEHICLES

Eugene A. Hagglund, Essex, Iowa

Application April 6, 1956, Serial No. 576,597

5 Claims. (Cl. 296—91)

The present invention relates generally to deflecting means applicable to vehicles for the purpose of preventing insects, gravel, etc. from striking the vehicle. More particularly, the invention has reference to a device falling in this general category that is particularly adapted to protect not only the windshield of the vehicle, but also the grill and front end of the vehicle hood.

By way of background, it may be noted that particularly on vehicles that are driven heavily with a substantial part of the accumulated mileage being in highway travel or upon rural roads, insects and gravel, flying into the windshield and the front end of the hood, not only tend to cause excessive time and work to be expended during cleaning of the vehicle, but further have the effect of swiftly damaging the finish of the vehicle. For example, gravel and insects flying into the grill and front end of the hood tend to pit the chrome-plated components, as well as the painted finish. Further, the road film, embedded particles of gravel and dust, and the remains of the insects are extremely difficult to remove.

Heretofore, it has been proposed to provide bug and gravel deflectors for vehicles, but these have all, to my knowledge, failed to provide full protection for the grill and the front end of the hood, while at the same time preventing the insects and gravel from striking the windshield. Prior art devices, so shaped as to cause the air to stream past the vehicle in a particular path or series of paths to carry in said paths the insects, are of course well known, but heretofore, have not involved the provision of a shield completely protecting the grill and front end of the hood, which shield is at the same time adapted to provide a plurality of air streams that will cause the insects and gravel to be led past the windshield.

The main object of the present invention is to provide a device which will have the particularly desirable characteristics mentioned above, not possessed by deflectors previously conceived.

A more specific object is to provide a device of the nature referred to which can be manufactured at relatively low cost, can be applied easily to the vehicle and can be removed with equal ease, and will provide an attractive addition to the front end appearance of the vehicle.

Another object of importance is to provide a deflector of the type referred to which can be shaped to fit different makes and body types of vehicles, while still retaining in every instance the principles of the invention.

Yet another object is to provide a deflector means that will be designed so as to prevent marring, rubbing, or scratching of the chrome or painted finish of the vehicle when said means is applied thereto.

Yet another object is to provide a device for deflecting bugs and gravel from a vehicle which will be shaped to protect the front end of the hood, as well as the grill, with the device having channels so designed as to cause the air to stream along the opposite sides of the vehicle, to prevent insects from flying against the windshield from the sides of the vehicle, with additional channels being provided for leading air directly over the top of the vehicle so as to deflect the insects upwardly from the windshield over the vehicle top.

Summarized briefly, the present invention comprises a plate-like deflector body, shaped to cover the grill of the vehicle, as well as the front end of the hood above and at the sides of the grill. The body has a center opening in which a screen is mounted, overlying the grill, and at the top edge of the body there is provided a plurality of channels, providing for the central and side air streams previously mentioned. The top edge of the plate-like body has a forwardly curved flange which will lead air into the several channels.

Other objects will appear from the following description, the claims appended thereto, and from the annexed drawings in which like reference characters designate like parts throughout the several views and wherein:

Figure 1:
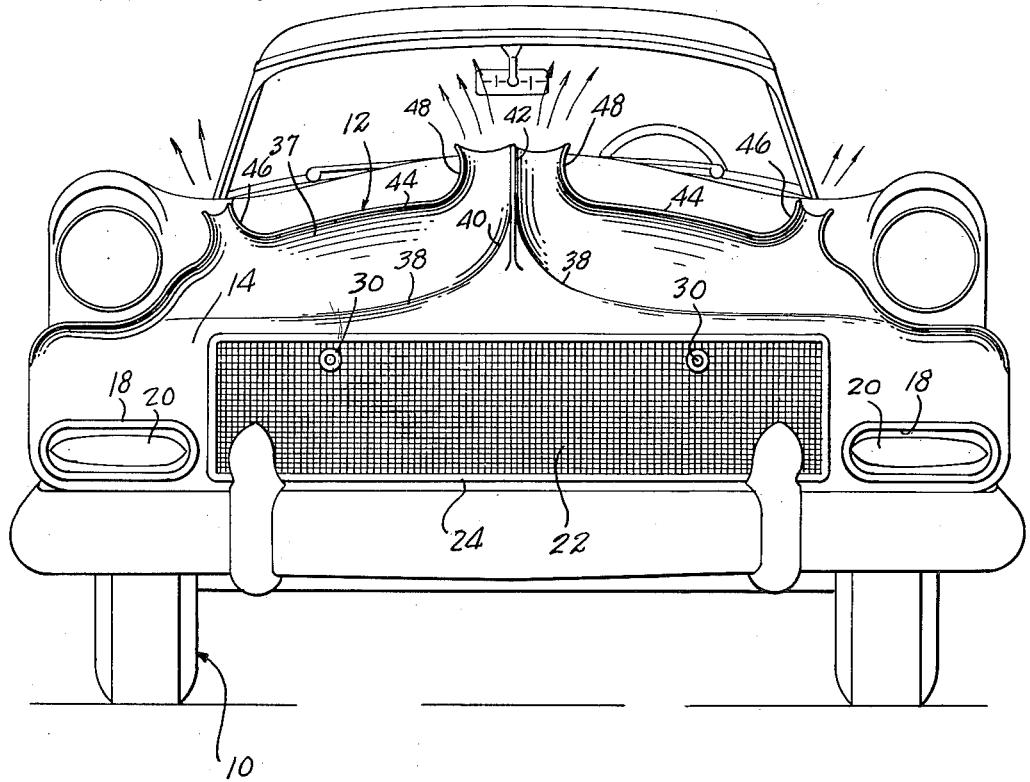
Figure 1 is a front view of an automobile equipped with a deflector formed according to the present invention.
Figure 2:
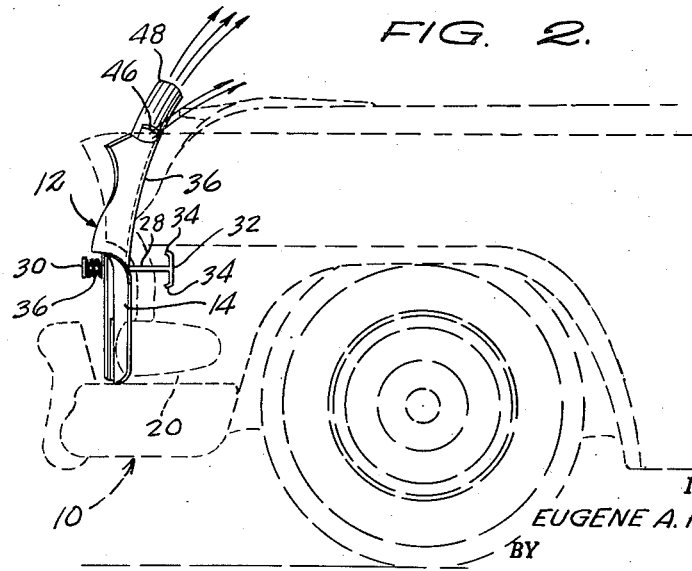
Figure 2 is a side elevational view of the device, the vehicle being shown in dotted outline.

Referring to the drawings in detail, the reference numeral 10 generally designates a conventional vehicle of modern design, to which is applied the insect and gravel deflector 12 constituting the present invention.

Figure 3:
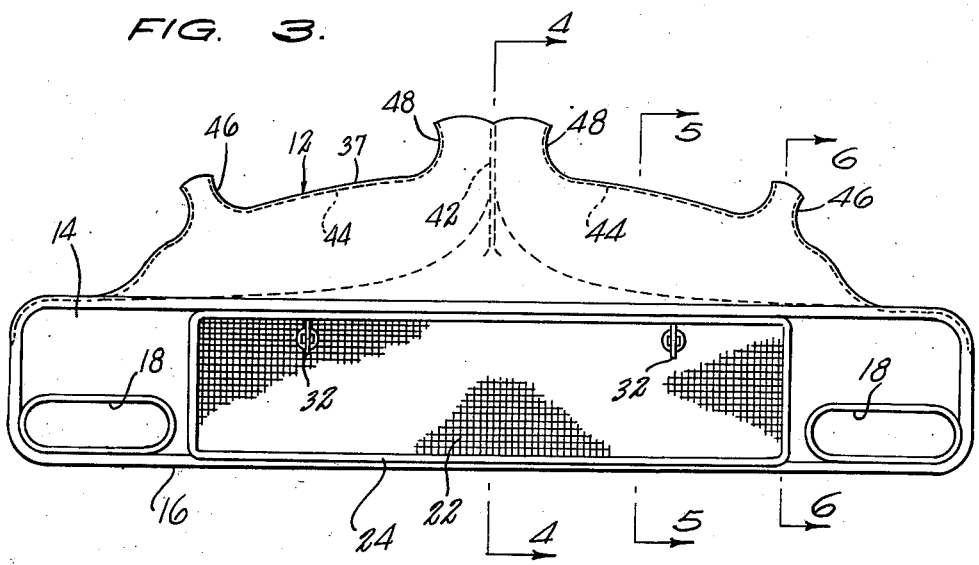
Fig. 3 is a rear elevational view of the device per se.
Figure 4:
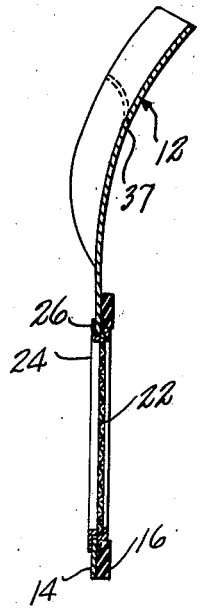
Figure 4 is a section on line 4—4 of Figure 3, on an enlarged scale.
Figure 5:
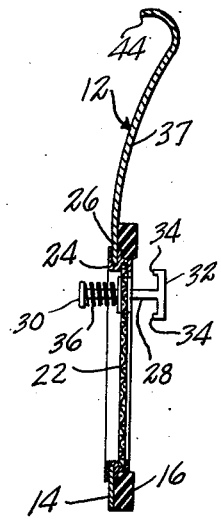
Figure 5 is an enlarged section on line 5—5 of Figure 3.
Figure 6:
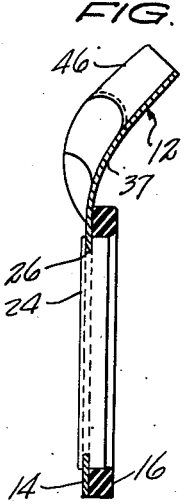
Figure 6 is an enlarged section on line 6—6 of Figure 3.

The device constitutes a wide, plate-like body 14 of substantial area, which can be formed of metal, plastic, or the like. As shown in Figures 1 and 3, the body has a lower portion of rectangular configuration, rimmed by a gasket 16 cemented or otherwise fixedly secured to the back surface of the plate-like body as shown in Figures 3–6. The gasket extends through the full periphery of the rectangular bottom portion of the device, and at the lower corners of said rectangular portion there are provided horizontally elongated, oblong openings 18 exposing the parking lights 20 of the vehicle.

A horizontally elongated, rectangular opening is formed in the rectangular lower portion of the body, in front of the grill of the vehicle. Within this opening there is mounted a screen 22 of a mesh sufficiently small as to prevent insects and gravel from passing therethrough, while still permitting the free passage of air through the grill. The screen 22 is mounted in a frame 24, having an outwardly facing peripheral groove receiving the edge portion of the center opening of the lower portion of the plate-like body 14.

To connect the device to the vehicle, there are provided attaching devices, the location and number of which may vary. Two are shown in the illustrated example, spaced transversely of the device as shown in Figure 3. Each of these includes a shank 28, having a front end projecting forwardly beyond the screen 22 and formed with a disc-like head 30. The other end of the shank projects rearwardly from the plate-like body, and has a cross arm 32 the ends of which are formed with forwardly projecting lugs 34. A compression coil spring is interposed between the head 30 and a washer mounted against the surface of the screen, so as to normally shift the shank 28 to the left in Figure 5, that is forwardly.

In this way, the lugs 34 will engage against spaced portions of the grill of the vehicle. For example, if the vehicle is of the type having spaced bars, the shank 28 would extend between the bars and the cross arm 32 would extend transversely of the bars with the lugs 34 either engaging directly against the bars of the vehicle grill or being disposed adjacent longitudinal edges of said bars.

By pressing inwardly upon the head 30 and partially rotating the shank 28, the cross arm 32 may be aligned with the spaced grill bars, so as to permit the cross arms to move between the grill bars of the vehicle, thereby to detach the device.

Above the rectangular lower portion, the plate-like body is integrally formed with an upwardly, rearwardly curving top portion 37, which in the present instance has a top edge which is bowed upwardly, whereby said top portion will cover substantially the entire front area of the vehicle hood above the grill of the vehicle.

In the front surface of the body, there are provided wide indentations 38, extending from the ends of the top portion toward the center of the device, said indentations or recesses opening upwardly through the provision of upwardly converging walls 40, in side-by-side center channels divided by a vertical partition 42.

The top edge of the upper portion of the body is formed with a forwardly curving flange 44, said flange being interrupted adjacent the opposite ends of the upper body portion by upwardly, rearwardly projecting channel portions 46. The flange or lip 44 is interrupted at the center of the device by upwardly, rearwardly projecting center channel portions 48 separated by the partition 42.

Due to the arrangement illustrated and described, the air striking the front of the device will be channeled partly through the screen 22, with any insects or gravel striking the screen and being thus prevented from striking and lodging against the grill. Such air as strikes the device above the screen will strike the recessed portion of the upper part of the body, and due to the forward motion of the vehicle and the position of the forwardly directed top flange 44, said air, seeking an escape, will flow upwardly through the channels 46, 48. The air flowing upwardly through the side channels 46 will be directed along the sides of the vehicle and accordingly, any insect approaching the vehicle from either side will be entrained in said air and will be carried past the vehicle sides without striking the windshield. The air passing upwardly through the center channels 48 will be directed upwardly, over the top of the vehicle, so as to prevent insects carried in the air stream from striking the vehicle windshield.

It will be seen that the device protectively covers the front end of the hood and vehicle grill, so that insects and gravel will not pit the same. Whenever desired, the device can be removed with maximum speed and ease. Further, the device not only is a protector for the vehicle front end, but also provides for side and centrally disposed air channels particularly adapted to cooperate in leading insects through paths that will prevent them from striking the vehicle windshield.

It will be understood that the particular shape of the device may be varied somewhat, according to the vehicle on which it is mounted. Since different makes of vehicles have differently shaped grills, the screened center opening of the device may be correspondingly shaped and might in some instances not be rectangular as shown. Further, the connecting means may necessarily have to be modified in certain instances due to the particular nature of the grill to which said connecting means is attachable. The same is true of the openings 18, which will be shaped and located for the parking lights of the particular vehicle on which the device is mounted. This is also true of the top portion. However, the general overall shape and structural characteristics, including particularly the adaptability of the device for covering substantially the entire front end of the vehicle hood and grill, and further particularly including the use of the side and top air channels leading from large recessed portions of the plate-like body, will be utilized in the device in every instance, so far as is known.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claims.

What is claimed is:

1. An insect and gravel deflector for mounting in position over the grill and the front end of the hood of an automobile, comprising a plate-like body shaped to overlie said grill and front end of the vehicle hood; means for connecting said body to the vehicle; and means on the body at the top thereof adapted for leading air striking the body along the sides of the vehicle and over the top of the vehicle, comprising a plurality of channels spaced apart along said top edge of the body, said channels opening upwardly and being inclined rearwardly from the body, said channels including a pair of side channels diverging upwardly so as to provide side air streams passing along opposite sides of the vehicle, and a pair of side-by-side center channels also diverging slightly upwardly from the body and arranged to lead air over the top of the vehicle.

2. An insect and gravel deflector for mounting in position over the grill and the front end of the hood of an automobile, comprising a plate-like body shaped to overlie said grill and front end of the vehicle hood; means for connecting said body to the vehicle; and means on the body at the top thereof adapted for leading air striking the body along the sides of the vehicle and over the top of the vehicle, comprising a plurality of channels spaced apart along said top edge of the body, said channels opening upwardly and being inclined rearwardly from the body, said channels including a pair of side channels diverging upwardly so as to provide side air streams passing along opposite sides of the vehicle, and a pair of side-by-side center channels also diverging slightly upwardly from the body and arranged to lead air over the top of the vehicle, the body including a partition extending upwardly from the central area of the body to the top edge thereof and separating the center channels from one another.

3. An insect and gravel deflector for mounting in position over the grill and the front end of the hood of an automobile, comprising a plate-like body shaped to overlie said grill and front end of the vehicle hood; means for connecting said body to the vehicle; and means on the body at the top thereof adapted for leading air striking the body along the sides of the vehicle and over the top of the vehicle, comprising a plurality of channels spaced apart along said top edge of the body, said channels opening upwardly and being inclined rearwardly from the body, said channels including a pair of side channels diverging upwardly so as to provide side air streams passing along opposite sides of the vehicle, and a pair of side-by-side center channels also diverging slightly upwardly from the body and arranged to lead air over the top of the vehicle, the body including a partition extending upwardly from the central area of the body to the top edge thereof and separating the center channels from one another, the body having a front surface formed with large recesses separated by said partition at one end, said recesses at said one end thereof opening into the center channels, the recesses extending from the center portion of the body substantially to the opposite ends thereof and opening, intermediate their ends, into the side channels, so as to cause air passing into said recess to be led into the respective channels.

4. An insect and gravel deflector for mounting upon the front end of a vehicle in overlying relation to the grill and the front portion of the vehicle hood, comprising: a plate-like body shaped to extend fully from side to side of the vehicle at the front thereof, thus to overlie the portions of the vehicle fenders disposed at opposite sides of the vehicle grill, the body having a center opening medially between its sides and said center opening being screened to protect the grill of the vehicle without permitting the passage of air through the body into the grill, the body including an upper portion overlying the center opening, said upper portion being recessed to receive air striking the body along the recessed portion thereof, the top edge of the body including a forwardly projecting lip and said lip being interrupted, at locations spaced transversely of the vehicle, by upwardly opening channels communicating with the recessed portion, whereby to lead air into said channels, said channels including a pair of side channels diverging upwardly to lead the air along the opposite sides of the vehicle and a pair of center channels disposed to lead air over the top of the vehicle.

5. An insect and gravel deflector for mounting upon the front end of a vehicle in overlying relation to the grill and the front portion of the vehicle hood, comprising: a plate-like body shaped to extend fully from side to side of the vehicle at the front thereof, thus to overlie the portions of the vehicle fenders disposed at opposite sides of the vehicle grill, the body having a center opening medially between its sides and said center opening being screened to protect the grill of the vehicle without permitting the passage of air through the body into the grill, the body including an upper portion overlying the center opening, said upper portion being recessed to receive air striking the body along the recessed portion thereof, the top edge of the body including a forwardly projecting lip and said lip being interrupted, at locations spaced transversely of the vehicle, by upwardly opening channels communicating with the recessed portion, whereby to lead air into said channels, said channels including a pair of side channels diverging upwardly to lead the air along the opposite sides of the vehicle and a pair of center channels disposed to lead air over the top of the vehicle; and means for connecting the body to the vehicle, comprising a plurality of shanks extending through said screen, said shanks including cross arms at one end adapted to engage in back of the vehicle grill and including heads at their other ends disposed forwardly of the screen, the shanks being rotatable within the screen and being shiftable axially therein, and compression springs circumposed about the shanks between the screen and heads, to normally urge the shanks forwardly to engage the cross arm with the grill of the vehicle.

References Cited in the file of this patent
UNITED STATES PATENTS

| | | |
|---|---|---|
| 2,184,882 | Meyer | Dec. 26, 1939 |
| 2,254,137 | Biehn | Aug. 26, 1941 |
| 2,501,065 | Longeway | Mar. 21, 1950 |
| 2,638,376 | Berry | May 12, 1953 |

FOREIGN PATENTS

| | | |
|---|---|---|
| 303,136 | Switzerland | Jan. 17, 1955 |